United States Patent [19]

Yasuda

[11] 3,881,988

[45] *May 6, 1975

[54] ANTISTATIC PAPER

[75] Inventor: Toshitaka Yasuda, Suita, Japan

[73] Assignee: Tatsuta Electric Wire & Cable Co., Ltd., Higashi-Osaka, Japan

[ * ] Notice: The portion of the term of this patent subsequent to Aug. 8, 1989, has been disclaimed.

[22] Filed: Mar. 13, 1973

[21] Appl. No.: 340,896

[30] Foreign Application Priority Data
Mar. 17, 1972  Japan................................ 47-28329

[52] U.S. Cl. ......... 162/181 A; 162/158; 162/181 B; 162/181 C; 162/181 D
[51] Int. Cl.............................................. D21h 3/66
[58] Field of Search............ 162/181 D, 158, 181 A, 162/181 B, 181 C; 117/100 B

[56]  References Cited
UNITED STATES PATENTS
3,682,696  8/1972  Yasuda.......................... 162/181 D

*Primary Examiner*—S. Leon Bashore
*Assistant Examiner*—William F. Smith
*Attorney, Agent, or Firm*—Wenderoth, Lind & Ponack

[57] ABSTRACT

This invention relates to an improved antistatic printing paper wherein antistatic agent is caused to adsorb or adhere to the entirety or part of the filler of said paper in greater density than to the paper fiber. The paper has excellent antistatic properties, whiteness and resistance to discoloration by light and heat. The antistatic agent has an HLB of above 9 to 17.

3 Claims, No Drawings

ANTISTATIC PAPER

This invention relates to an inexpensive antistatic printing paper having antistatic properties, excellent whiteness and strong resistance to discoloration by light and heat.

In the dry season, printing paper is charged with static electricity during the printing process. The static electricity renders the printing operation difficult, deteriorating the printing finish, causing an electric shock, or even starting a fire.

Heretofore, various measures have been taken to obviate these difficulties but without much avail. For example, the method of providing an electricity removing apparatus has a disadvantage in that the effect is limited to the location where the apparatus is provided. The method of moistening paper prior to the printing operation not only impairs efficiency but also lacks constant effect. Furthermore, although an attempt has been made to impart antistatic properties to printing paper by applying an antistatic agent thereto, no agent has been yet introduced which is available at a low price and superior in antistatic characteristics.

The reason for the above difficulties is that paper is manufactured by using water and antistatic agents employable during the paper manufacturing process were restricted to water soluble agents. Generally, however, water soluble antistatic agents are unsuitable for printing paper since such agents are liable to render the paper fiber susceptible to discoloration when exposed to light or heat. On the other hand, in the case of using antistatic agents that are insoluble in water, the paper fiber is generally rendered free from the risk of being discolored by light, heat, or the like. However, such agents are not usable in the conventional paper manufacturing method in which water is used.

This invention relates to printing paper having excellent characteristics for use as printing paper and antistatic properties, said printing paper being obtainable by using antistatic agents insoluble or hardly soluble in water which agents were previously not usable in the conventional method. Moreover said antistatic agents are characterized in being adsorbed or adhering to all, or part of the paper filler in greater density than to the paper fiber. This invention will be described in detail below.

As mentioned above, antistatic agents used in paper are generally liable to render the paper fiber susceptible to discoloration when exposed to the light or heat. If a suitable antistatic agent is carefully selected, the paper fiber is comparatively safe but not completely free from the risk of discoloration. Moreover, the selection and acquisition of suitable antistatic agents involve considerable cost and are uneconomical.

If an antistatic agent can be caused to adhere to the filler of printing paper in greater density than to the paper fiber, the amount of the antistatic agent adhering to the paper fiber is reduced without impairing the antistatic effect, with the result that, even when the antistatic agent renders the paper fiber more or less susceptible to discoloration by the light or heat, the paper is free from the risk of discoloration and loss of excellent printing paper characteristics.

If the filler is very white, printing paper of a satisfactory whiteness is obtainable even when a slightly colored antistatic agent is used. This invention therefore enables simplification of the selection of suitable antistatic agents and reduces the production cost of antistatic printing paper. This invention is performed, for example, as described below.

1. Antistatic printing paper is manufactured by causing a small amount (less than 5 percent of the filler by weight) of an antistatic agent insoluble or hardly soluble in water at normal temperature to be adsorbed on all or part of the printing paper filler, said filler being admixed with pulp in the beater during the paper manufacturing process.

2. Antistatic coated printing paper is manufactured by causing a small amount (less than 5 percent of the filler by weight) of an antistatic agent insoluble or hardly soluble in water at normal temperature to be adsorbed on all or part of the filler for a coating composition for use in the coating treatment during the paper manufacturing process.

In both cases 1 and 2, since the antistatic agent adhering to the filler is insoluble or hardly soluble in water at normal temperature, a large percentage of said antistatic agent adheres to the filler after the manufacture of paper has been completed. As a basis for selecting suitable antistatic agents, the HLB thereof can be utilized. So far as the HLB is concerned, the smaller, the better, but the HLB can be up to a maximum rate of 16 – 17. "HLB" means "Hydrophile-Lypophile Balance" of the molecule constituting the electrification preventive agent.

In case 1, since the antistatic agent either remains adhering to the filler or is washed away with water, said antistatic agent scarcely remains in adherence to the paper fiber. Consequently, the paper is not only free from the risk of being colored by the very antistatic agent (even when said antistatic agent is colored) but also free from the risk of being discolored (even when said antistatic agent has the property of rendering the paper fiber more or less susceptible to discoloration by the light or heat). Therefore, suitable antistatic agents can be selected with ease and the production cost of antistatic printing paper can be reduced. Moreover, if the antistatic agent is caused to adsorb only to part of the filler, the cost for the adsorption can be lowered, thereby enabling the total production cost of the printing paper to be further reduced.

In case 2, since the greater part of the antistatic agent remains adhering to the filler and the agent adhering to the paper fiber is negligible, the manufactured paper is less susceptible not only to coloring by the very antistatic agent but also to discoloration by light or heat, than in the case in which an identical amount of the antistatic agent is caused to adhere to both the filler and the paper fiber uniformly, with the result that not only the selection of a suitable antistatic agent is simplified but also the production cost of the paper treated with antistatic agent can be reduced. If the antistatic agent is caused to adsorb only to a part of the filler, the production cost of the coated paper is further reducible since the adsorption cost can be economized.

The filler used in this invention may be of any kind insofar as it is suitable for use in manufacturing paper. Suitable fillers include kaoline, clay, talc, aluminum hydroxide, titanic oxide, gypsum, magnesium oxide, calcium carbonate, magnesium carbonate, zinc sulphide, silica, calcium silicide, magnesium silicide, barium sulphate, etc.

The antistatic agent used in this invention may be selected from among ordinary antistatic agents available in the market (for example, antistatic agents for plastics), subject to said antistatic agent being insoluble or hardly soluble in water at normal temperature. Suitable antistatic agents include:

1. Insoluble and scarcely dispersive materials (HLB: Less than 4), for example, stearoylamidopropyldimethylhydroxyethyl ammonium perchlorate

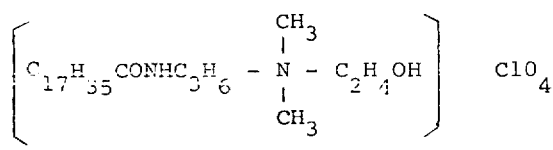

2. Insoluble and slightly dispersive materials (HLB: 4-9), for example, stearoylamidoethyldimethylhydroxyethyl ammonium chloride

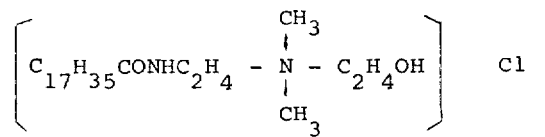

3. Insoluble and lacteally dispersive materials (HLB: 9-16), for example, solvitanmonolaurate

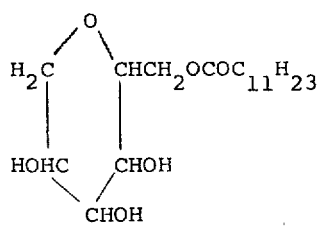

4. Transparently soluble materials (HLB: more than 16 but up to 20 approximately), for example, hexadecyltrimethyl ammonium chloride

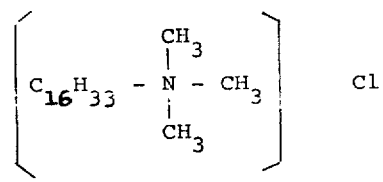

Furthermore, the antistatic agent may be caused to adsorb to the filler by any method (for example, an antistatic agent solution by means of a solvent or a warm water solution of an antistatic agent is prepared, the filler being admixed therewith and then dried).

Suitable paper fibers include ground pulp, sulphite pulp, alkali processed wood pulp, chemi-ground pulp, semi-chemical pulp, etc.

Preferred examples are described hereinunder.

EXAMPLE 1

A number of antistatic agents for plastics available in the market are selected, said antistatic agents being caused to adsorb to paper filling clay each independently up to 0.25 percent thereof by weight ( a predetermined amount of clay is admixed with a solution prepared by dissolving a required amount of the antistatic agent in a solvent, said clay being dried thereafter. The solvent may be replaced by warm water, if circumstances require.), said filling clay being admixed each independently with pulp in the beater during the paper manufacturing process up to 25 percent of said pulp by dry weight, thus the antistatic printing paper of this invention being produced. Table No. 1 shows a comparison of the antistatic effects and the discoloration by heat.

Table No. 1

| Solubility of Antistatic Agent in Water at Normal Temperature | Antistatic Effect | Discoloration by Heat (In the air, 120°C. an hour) |
|---|---|---|
| 1)Stearoylamidopropyldimethylhydroxyethyl ammonium perchlorate | Excellent | Nil |
| 2)Stearoylamidoethyldimethylhydroxyethyl ammonium chloride | Excellent | Nil |
| 3)Solvitanmonolaurate | Good | Nil |
| 4)Hexadecyltrimethyl ammonium chloride | Less effective | Nil |

EXAMPLE 2

A number of antistatic agents for plastics available in the market are selected, said antistatic agents being caused to adsorb each independently to paper filling clay up to 0.2 percent thereof by weight (a predetermined amount of clay is admixed with a solution prepared by dissolving a required amount of the antistatic agent in a solvent, said clay being dried thereafter. The solvent may be replaced by warm water, if circumstances require.), paper coating compositions being produced by admixing said clay with ordinary paper filling clay each in an identical amount, said coating compositions being coated each independently over sheets of paper so that the ash content thereof may be approximately 20 percent, thus the paper treated with antistatic agent of this invention being produced. Table No. 2 shows a comparison of the antistatic effects and the discoloration by the heat and ultraviolet rays.

Table No. 2

| Solubility of Antistatic Agent in Water Normal Temperature | Antistatic Effect | Discoloration by Heat (In the air, 120°C, an hour) | Discoloration by Ultraviolet Rays (exposed for 240 hrs.) |
|---|---|---|---|
| Insoluble and hardly dispersive | Excellent | Nil | Nil |
| Insoluble and slightly dispersive | Excellent | Nil | Nil |
| Insoluble and lacteally dispersive | Excellent | Slightly discolored | Slightly discolored |

Table No. 2-Continued

| Solubility of Antistatic Agent in Water Normal Temperature | Antistatic Effect | Discoloration by Heat (In the air, 120°C, an hour) | Discoloration by Ultraviolet Rays (exposed for 240 hrs.) |
|---|---|---|---|
| Transparently soluble | Excellent | Discolored | Discolored |

EXAMPLE 3

Test samples are prepared comprising: paper (A) containing clay up to 20 percent thereof by weight, said paper being prepared by admixing clay, to which antistatic agent insoluble in water but rendering the paper fiber slightly susceptible to discoloration by the light or heat is caused to adsorb up to 0.2 percent of said clay by weight, with pulp in the beater during the paper manufacturing process up to 30 percent thereof by dry weight; paper (B) coated with a coating composition comprising clay to which said antistatic agent is caused to adsorb, said paper being coated with said clay up to 20 percent of paper by weight; paper (C) containing 20 percent of ordinary clay by weight, said paper being impregnated with a 0.1 percent alcoholic solution of said antistatic agent up to 40 percent of said paper by weight, said paper being dried thereafter; paper (D) coated with ordinary clay up to 20 percent thereof by weight, said paper being then impregnated with said alcoholic solution up to 40 percent thereof by weight, said paper being dried thereafter. Table No. 3 shows a comparison of the antistatic effects and the discoloration by the heat in the air and ultraviolet rays in reference to each of the aforementioned papers.

Table No. 3

| Test Sample | A | B | C | D |
|---|---|---|---|---|
| Antistatic Effect | Excellent | Excellent | Excellent | Excellent |
| Discoloration by Heat (In the air, 120°C, an hour) | Nil | Nil | Slightly discolored | Slightly discolored |
| Discoloration by Ultraviolet Rays (Exposed for 240 hrs) | Nil | Nil | Imperceptibly discolored | Imperceptibly discolored |

EXAMPLE 4

Test samples are prepared comprising: paper (A) containing clay up to 20 percent thereof by weight, said paper being prepared by admixing clay, to which an orange-colored antistatic agent hardly soluble in water is caused to absorb up to 0.2 percent of the clay by weight, with pulp in the beater during the paper manufacturing process up to 30 percent said pulp by dry weight; paper (B) coated with a coating composition comprising clay to which said antistatic agent is caused to adsorb, said paper being coated with said clay up to 20 percent of paper by weight; paper (C) containing 20 percent of ordinary clay by weight, said paper being impregnated with a 0.1 percent alcoholic solution of said antistatic agent up to 40 percent of said paper by weight, said paper being dried thereafter; paper (D) coated with ordinary clay up to 20 percent of said paper by weight, said paper being impregnated with said same alcoholic solution up to 40 percent of said paper by weight. Table No. 4 shows a comparison of whiteness in reference to each of said papers.

Table No. 4

| Test Sample | A | B | C | D |
|---|---|---|---|---|
| Whiteness | Good | Good | Slight coloring is perceptible in part | Slight coloring is perceptible in part |

I claim:

1. An antistatic printing paper comprising paper fibers and a paper filler characterized in that an antistatic agent of HLB ranging from above 9 to 17 is absorbed or caused to adhere to the entirety or part of the paper filler in greater density than to the paper fiber, the amount of antistatic agent being less than 5 percent based on the weight of the filler, the amount of the filler being up to 30 percent by weight of the paper.

2. An antistatic printing paper as claimed in claim 1 wherein the paper filler is selected from the group consisting of kaolin, clay, talc, aluminum hydroxide, titanium oxide, gypsum, magnesium oxide, calcium carbonate, magnesium carbonate, zinc sulfide, silica, calcium silicate, magnesium silicate and barium sulfate, the amount of filler being up to 20 percent by weight of the paper.

3. An antistatic printing paper according to claim 2 wherein the antistatic agents are selected from the group consisting of solvitanmonolaurate and hexadecyltrimethyl ammonium chloride.

* * * * *